United States Patent
Han et al.

(10) Patent No.: US 10,850,601 B2
(45) Date of Patent: Dec. 1, 2020

(54) SERIES-HYBRID ELECTROMECHANICAL COMPOUND TRANSMISSION DEVICE FOR TRACKED VEHICLE

(71) Applicant: Beijing Institute of Technology, Beijing (CN)

(72) Inventors: Lijin Han, Beijing (CN); Changle Xiang, Beijing (CN); Hui Liu, Beijing (CN); Weida Wang, Beijing (CN); Yue Ma, Beijing (CN); Lili Xu, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 16/745,953

(22) Filed: Jan. 17, 2020

(65) Prior Publication Data

US 2020/0231031 A1 Jul. 23, 2020

(30) Foreign Application Priority Data

Jan. 17, 2019 (CN) .......................... 2019 1 0044832

(51) Int. Cl.
| | |
|---|---|
| *B60K 6/36* | (2007.10) |
| *B60K 6/28* | (2007.10) |
| *B60K 6/30* | (2007.10) |
| *F16H 37/06* | (2006.01) |
| *B60K 6/365* | (2007.10) |

(Continued)

(52) U.S. Cl.
CPC ................ *B60K 6/365* (2013.01); *B60K 6/24* (2013.01); *B60K 6/26* (2013.01); *B60K 6/28* (2013.01); *B60K 6/30* (2013.01); *B60K 6/387* (2013.01); *B60K 6/442* (2013.01); *B60K 6/547* (2013.01); *F16H 37/06* (2013.01); *B60K 2006/381* (2013.01); *B60Y 2200/92* (2013.01);

(Continued)

(58) Field of Classification Search
None
See application file for complete search history.

(56) References Cited

U.S. PATENT DOCUMENTS

| | | | |
|---|---|---|---|
| 2013/0109530 A1* | 5/2013 | Kaltenbach | ............. F16H 37/06 477/5 |
| 2013/0172140 A1* | 7/2013 | Potter | ...................... B60K 6/54 475/5 |

(Continued)

*Primary Examiner* — Colby M Hansen
(74) *Attorney, Agent, or Firm* — Flener IP & Business Law; Zareefa B. Flener

(57) ABSTRACT

The present invention discloses an electromechanical compound transmission device for a tracked vehicle. The electromechanical compound transmission device includes a front transmission mechanism, a power coupling mechanism, an independent drive mechanism, and convergent planetary gearsets arranged on both sides of the power coupling mechanism. The present invention can not only implement driving, steering, and other functions of a vehicle, but also provide sufficient electric energy for a vehicle-mounted device. In other words, a series mode can be adopted to satisfy a torque output requirement, and is mainly used for low and medium-low speed driving, as well as reverse driving and climbing steep slopes; and a series-parallel mode can also be adopted to satisfy requirements of high and medium-high speed driving, and can achieve relatively high transmission efficiency and fuel economy.

7 Claims, 3 Drawing Sheets

(51) Int. Cl.
*B60K 6/387* (2007.10)
*B60K 6/442* (2007.10)
*B60K 6/24* (2007.10)
*B60K 6/547* (2007.10)
*B60K 6/26* (2007.10)
*B60K 6/38* (2007.10)

(52) U.S. Cl.
CPC ............... *F16H 2200/0021* (2013.01); *F16H 2200/2017* (2013.01); *F16H 2702/02* (2013.01)

(56) References Cited

U.S. PATENT DOCUMENTS

| | | | |
|---|---|---|---|
| 2013/0324341 A1* | 12/2013 | Cho .................... | B60K 6/48 475/5 |
| 2016/0033015 A1* | 2/2016 | Hwang ................. | B60K 6/445 475/5 |
| 2016/0102742 A1* | 4/2016 | Lee ...................... | B60K 6/48 475/5 |
| 2017/0166183 A1* | 6/2017 | Cho ..................... | B60K 6/383 |
| 2018/0043764 A1* | 2/2018 | McKinzie ............. | B60K 6/48 |
| 2018/0111471 A1* | 4/2018 | Lee ...................... | F16H 3/725 |

* cited by examiner

SERIES-HYBRID ELECTROMECHANICAL COMPOUND TRANSMISSION DEVICE FOR TRACKED VEHICLE

TECHNICAL FIELD

The present invention relates to the technical field of electromechanical compound transmission devices, and in particular, to an electromechanical compound transmission device for a tracked vehicle.

BACKGROUND

At present, many developed countries have proposed the concept of all electric combat vehicles. These vehicles mainly include electrical drive systems, electric armored systems, electric weapon systems, etc. A most key issue is that these types of vehicles need to be supplied with sufficient electric energy. Therefore, it is of great significance to develop an electromechanical compound transmission system that satisfies both a vehicle driving requirement and an electric energy requirement of the whole vehicle.

Existing electromechanical compound transmission systems have diversified structure forms. These structure forms can be roughly divided into two types according to whether a mechanical torque of an engine drives a vehicle. In one type of structure form, an engine drives a generator to generate electricity to provide sufficient electric energy for the vehicle, while the vehicle is completely driven by a motor. This belongs to a series-hybrid power scheme. In the other type of structure form, an engine drives a generator to generate electricity, while also drives the vehicle directly through mechanical transmission. This belongs to a parallel or series-parallel hybrid power scheme. The schemes both have advantages and disadvantages. Generally, the former one is suitable for tracked vehicles with relatively low power, while the latter one is suitable for high-power tracked vehicles.

In the series-hybrid power scheme, the engine is allowed to operate independent of a torque driving the vehicle and a revolution speed to a certain extent, which can improve the emission and efficiency of the engine. In addition, in consideration of good driving characteristics and relatively high power density of a motor, the power performance of the vehicle can be improved by driving using multiple motors. Moreover, when being used as a generator, a motor can recover braking energy through regenerative braking. The difficulty in the series scheme lies in that: Sufficient motors are required to convert all power of the engine from mechanical energy into electric energy of the generator, and then convert the electric energy into mechanical energy for driving the motors. Therefore, costs and weights of these motors have to be considered. In addition, a loss of useful energy during these conversions needs to be prevented.

In the parallel or series-parallel scheme, a torque ratio and a speed ratio between input and output can be changed by a power distribution transmission. The transmission is usually a differential gear device. It can transfer partial power of the engine to a pair of motors/generators for conversion. The rest power is transferred along another parallel line in a purely mechanical way.

The existing electromechanical compound transmission systems are mostly used for wheeled vehicles. As traveling modes of a tracked vehicle and a wheeled vehicle are different fundamentally, their traveling mechanisms are necessarily different fundamentally. Therefore, a conventional electromechanical compound transmission system for wheeled vehicles cannot be used for tracked vehicles. In addition, in the prior art, there are rare electromechanical compound transmission systems for tracked vehicles. Compared with wheeled vehicles, tracked vehicles have their own advantages. However, how to implement an electromechanical compound transmission system for tracked vehicles is a long-standing technical problem in this field.

SUMMARY

An objective of the present invention is to provide an electromechanical compound transmission device for a tracked vehicle, to well resolve the problems mentioned above. The present invention can not only implement driving, steering, and other functions of a vehicle, but also provide sufficient electric energy for a vehicle-mounted device.

The present invention provides an electromechanical compound transmission device for a tracked vehicle, including a front transmission mechanism, a power coupling mechanism, an independent drive mechanism, and convergent planetary gearsets arranged on both sides of the power coupling mechanism, where the front transmission mechanism includes a main clutch configured to cut off power of an engine, two to three spur gear engagement pairs, and the spur gear engagement pair is configured to match a transmission ratio and adjust positions of the engine, the power coupling mechanism, and the independent drive mechanism;

the power coupling mechanism includes two planetary gearsets, two motors/generators, and two control components; the spur gear engagement pair drives a spur gear; the spur gear is drivingly connected to a planet carrier of a second planetary gearset, a ring gear of the second planetary gearset is fixedly connected to a planet carrier of a first planetary gearset, and a rotor of a first motor/generator is connected to a ring gear of the first planetary gearset; the power coupling mechanism further includes a power coupling mechanism clutch and a brake; a driving part of the power coupling mechanism clutch is connected to the planet carrier of the first planetary gearset, and a driven part of the power coupling mechanism clutch is connected to a power coupling output spindle; the first motor/generator is located between the power coupling mechanism clutch and the first planetary gearset; sun gears of the first planetary gearset and the second planetary gearset are connected together and are connected to a rotor of a second motor/generator, and the second motor/generator is located between the second planetary gearset and the convergent planetary gearset on the right side; the power coupling output spindle provides output to ring gears of the convergent planetary gearsets; and the independent drive mechanism includes two motors, two planetary gearsets, and multiple spur gears, where power of the two motors is respectively output to spindles through deceleration planetary gearsets, and is output to sun gears of the convergent planetary gearsets through multiple gear engagements of spur gears; planet carriers of the convergent planetary gearsets on the left and right side are output components of the electromechanical compound transmission device; and the power is finally transferred to drive wheels on two sides of a vehicle body.

Further, the first motor/generator and the second motor/generator of the power coupling mechanism and the two motors of the independent drive mechanism are connected to a controller through wires; and the controller is connected to an energy storage device through wires.

Further, the energy storage device is one or more of a chemical storage battery, a supercapacitor, and a flywheel battery.

Further, the brake is a wet multi-disc brake; and the power coupling mechanism clutch is a wet multi-disc clutch.

Further, all the first motor/generator, the second motor/generator, and the two independent drive motors are permanent magnet synchronous motors, and all rotors thereof include hollow shafts.

Further, the first motor/generator, the second motor/generator, the two independent drive motors, and the energy storage device are connected to a control unit through wires.

Further, the engine is a diesel engine.

Beneficial effects of the present invention are as follows: When a vehicle is in a straight line driving condition, it can be separately driven by an independent driving part or a power coupling part. Both modes can implement stepless electromechanical compound transmission. Driving the vehicle by the independent driving part is a first mode, which is used for a vehicle speed range from zero to a moderate speed. In the first mode, an engine drives two motors/generators of a power coupling mechanism to generate electricity, and both straight driving and steering of the vehicle are implemented by two independent drive motors. Driving the vehicle by the power coupling part is a second mode, which can be used for a vehicle speed range from a speed lower than the highest speed in the first mode to the highest speed of the vehicle. In the second mode, when a revolution speed of the engine keeps unchanged, stepless regulation can be conducted on an output vehicle speed by adjusting revolution speeds of a first motor/generator and a second motor/generator of the power coupling mechanism, to improve the driving performance of the vehicle. In the second mode, an independent drive motor can operate in a power generation condition or an electric condition according to a drive requirement, and can be used to provide high-power electric energy or achieve good power performance. When revolution speeds of independent drive motors are different, steering of the tracked vehicle can be implemented. Regenerative power of an inner track during steering in driving can flow back through a main axis of a straight-driving variable speed path and transferred to an outer track, to improve the steering performance of the vehicle. In the present invention, advantages of a series scheme and a series-parallel scheme are combined. The series mode is suitable for a low-speed operating condition, and can satisfy requirements of low-speed slope climbing and driving in reverse gear based on a large torque and multi-quadrant operation of a motor. The series-parallel mode is suitable for a medium-high speed operating condition, and makes full use of high mechanical transmission efficiency and stepless speed changing of electric transmission, to realize efficient stepless transmission. A control component can implement switching between the first mode and the second mode without a speed deviation. This improves the smoothness of mode switching and reduces the impact and mode switching time.

According to a characteristic that a relatively large torque is required when a tracked vehicle climbs a slope at a low speed, the first mode is mainly used for climbing a large slope of 32°, etc., or other roads extremely difficult to drive upon. It can also be used to implement low-speed driving, accelerated driving, center steering, etc. of the vehicle.

In other words, the first mode is a series mode, which can satisfy a torque output requirement, and is mainly used for low and medium-low speed driving, as well as reverse driving and climbing steep slopes. The second mode is a series-parallel mode, which can satisfy requirements of high and medium-high speed driving and achieve relatively high transmission efficiency and fuel economy.

DETAILED DESCRIPTION

To make the objectives, technical solutions, and advantages of the present invention clearer, the following describes the present invention in more detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the scope of projection of the present invention.

In the description of the present invention, it should be noted that orientations or position relationships indicated by terms "center", "upper", "lower", "left", "right", "vertical", "horizontal", "inner", "outer", etc. are orientations or position relationships shown in the accompanying drawings, and these terms are only used to facilitate description of the present invention and simplify the description, but not to indicate or imply that the mentioned apparatus or components must have a specific orientation or must be established and operated in a specific orientation, and thus these terms cannot be understood as a limitation to the present invention. Moreover, the terms such as "first" and "second" are used herein only for the purpose of description, and cannot be understood to indicate or imply relative importance.

In the description of the present invention, it should be noted that, unless otherwise clearly specified and limited, meanings of terms "arranged", "connected to", and "connection" should be understood in a board sense. For example, "connection" may be a fixed connection, a removable connection, or integration; may be a mechanical connection or an electrical connection; may be a direct connection or an indirect connection implemented by using an intermediate medium; or may be intercommunication between two components. A person of ordinary skill in the art may understand specific meanings of the foregoing terms in the present invention based on a specific situation.

Figure 1:
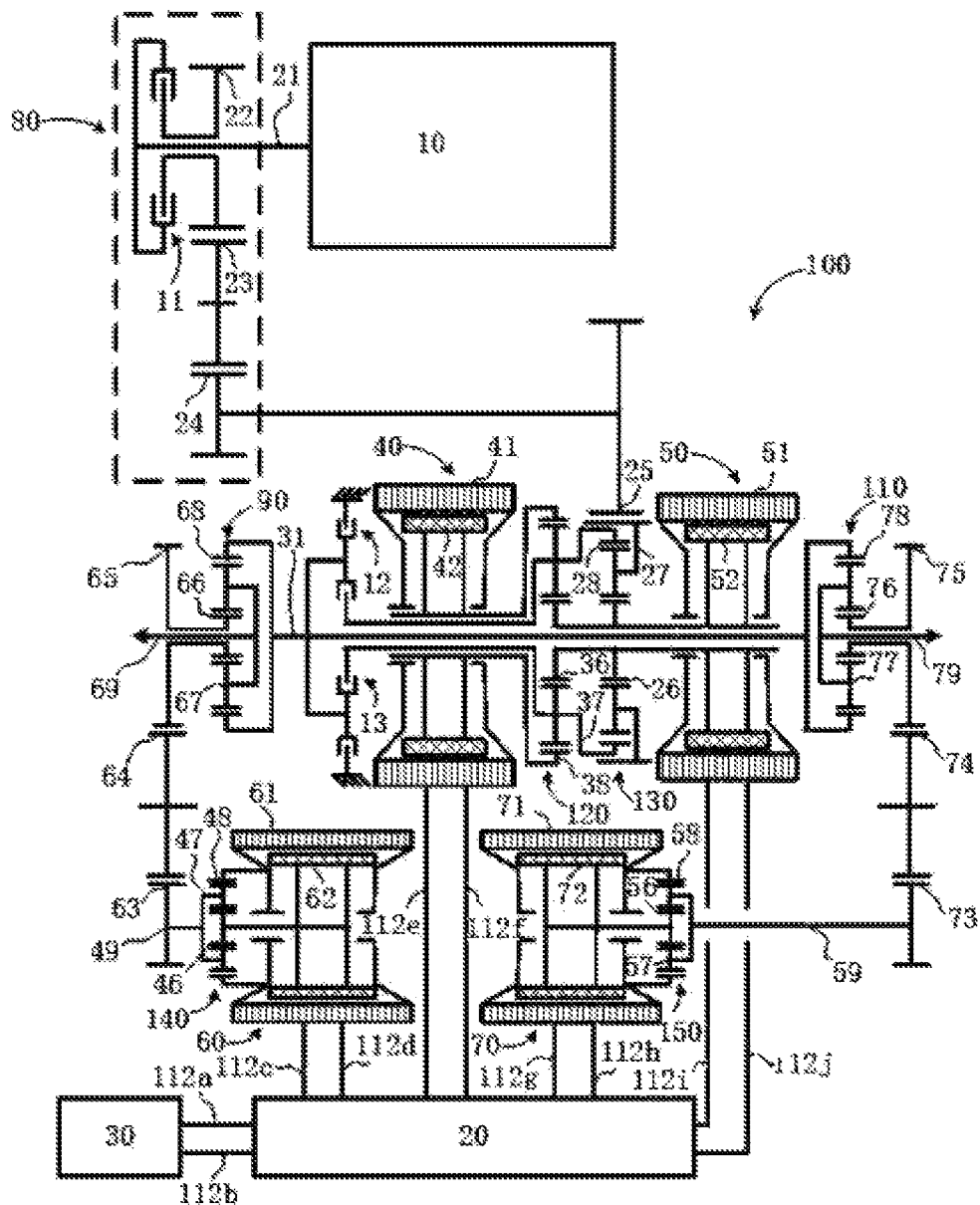
FIG. 1 is a schematic diagram of an electromechanical compound transmission device in an implementation solution of the present invention.

FIG. 1 shows a representative implementation manner of an electromechanical compound transmission device for a tracked vehicle according to a solution of the present invention. The whole device is represented by a reference sign 100. The electromechanical compound transmission device includes a front transmission mechanism 80, a power coupling mechanism, and an independent drive mechanism, and further includes convergent planetary gearsets 90 and 110 on both sides thereof. The front transmission mechanism includes a main clutch 11 and three spur gears 22, 23, and 24, where the main clutch is configured to cut off or put through power of an engine 10; and the three spur gears 22, 23, and 24 engage with each other, and are configured to match a transmission ratio and adjust relative positions of the engine 10, the power coupling mechanism, and the independent drive mechanism.

The power coupling mechanism includes two planetary gearsets, two motors/generators, and two control components. Input power is transferred to a planet carrier 27 of a second planetary gearset 130 through a spur gear 25. A ring gear 28 of the second planetary gearset 130 is fixedly connected to a planet carrier 37 of a first planetary gearset 120. A rotor 42 of a first motor/generator 40 is connected to a ring gear 38 of the first planetary gearset 120. A driving part of a power coupling mechanism clutch 13 is connected to the planet carrier 37 of the first planetary gearset 120, and a driven part of the power coupling mechanism clutch 13 is connected to a power coupling output spindle 31. The first motor/generator 40 is located between the clutch 13 and the first planetary gearset 120. Sun gears 26 and 36 of the first planetary gearset 120 and the second planetary gearset 130 are connected together and are connected to a rotor 52 of a second motor/generator 50, and the second motor/generator 50 is located between the second planetary gearset 130 and the convergent planetary gearset 110 on the right side. The power coupling output spindle 31 provides output to ring gears 68 and 78 of the convergent planetary gearsets 90 and 110.

The independent drive mechanism includes two motors 60 and 70, two planetary gearsets 140 and 150, and six spur gears 63, 64, 65, 73, 74, and 75. Power of the two motors 60 and 70 is respectively output to spindles 49 and 59 through deceleration planetary gearsets 140 and 150, and is output to sun gears 66 and 76 of the convergent planetary gearsets 90 and 110 through multiple gear engagements of spur gears. Planet carriers 67 and 77 of the convergent planetary gearsets 90 and 110 on the left and right side are output components of the electromechanical compound transmission device; and the power is finally transferred to drive wheels on two sides of a vehicle body.

The motors/generators 40 and 50 and the motors 60 and 70 are connected to a controller 20 through wires 112; and the controller 20 is connected to an energy storage device 30 through wires 112. The energy storage device may be a chemical storage battery, or may be a supercapacitor, a flywheel battery, etc.

Figure 2:
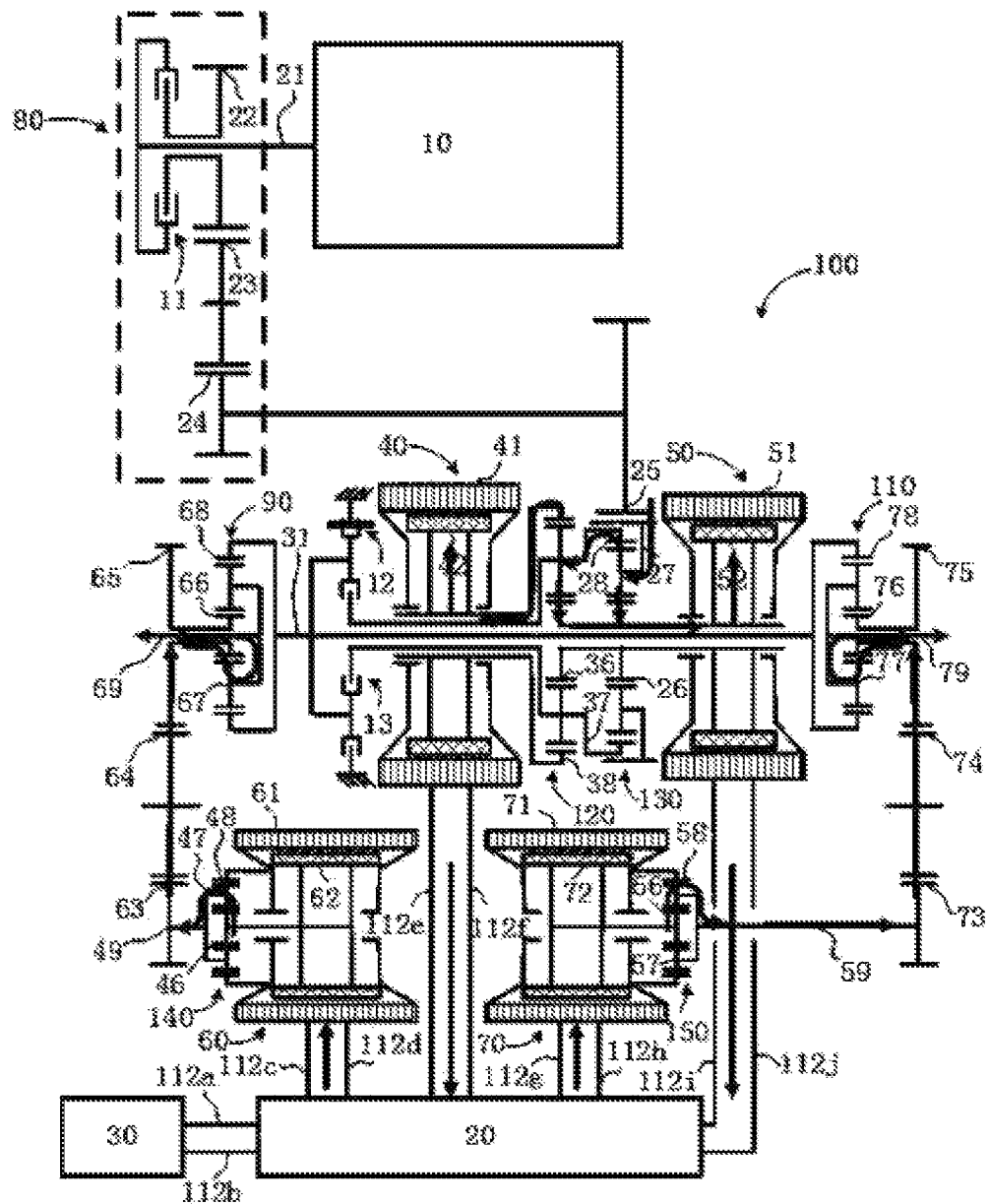
FIG. 2 is a schematic diagram of a power flow of a power coupling mechanism in a first mode when a brake conducts braking.

FIG. 2 shows a power flow of the power coupling mechanism in a first mode. In this case, a brake 12 conducts braking. Power of the engine is input, and then is split by the ring gear 28 and the sun gear 26 after passing through the planet carrier 27 of the second planetary gearset 130. A power flow through the ring gear 28 is split again through the planet carrier 37 of the first planetary gearset 120. One part of the power drives, through the ring gear 38 of the first planetary gearset 120, the first motor/generator 40 to generate electricity. Others part of the power are converged through the sun gear 36 of the first planetary gearset 120 and the sun gear 26 of the second planetary gearset 130, to jointly drive the second motor/generator 50 to generate electricity.

Figure 3:
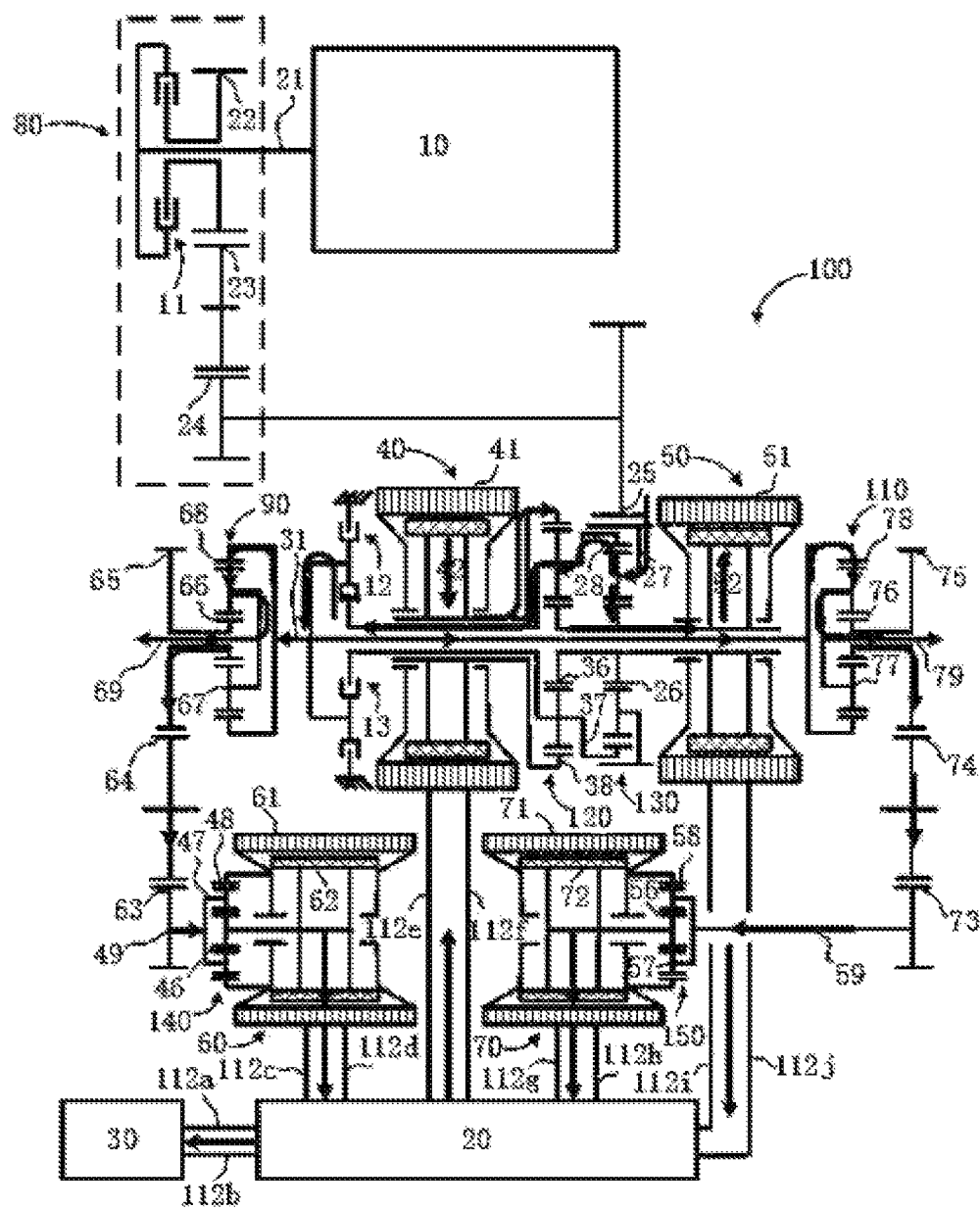
FIG. 3 is a schematic diagram of a power flow of a power coupling mechanism in a second mode after switching from a first mode.

FIG. 3 shows a power flow of the power coupling mechanism in a second mode. In this case, the clutch 13 engages power transmission. Power of the engine is input, and then is split by the ring gear 28 and the sun gear 26 after passing through the planet carrier 27 of the second planetary gearset 130, where one part of the power is transferred to the planet carrier 37 of the first planetary gearset 120 through a power flow of the ring gear 28. Another part of the power is split again through the sun gear 26 of the second planetary gearset 130. One part of the power is transferred to the sun gear 36 of the first planetary gearset 120, and another part of the power drives the second motor/generator 50 to generate electricity to transfer electric power to the first motor/generator 40. In this case, the first motor/generator 40 operates in an electric condition, and its power is output to the ring gear 38 of the first planetary gearset 120. Power of the first planetary gearset 120 at three parts is converged, and is transferred to the output spindle 31 through the clutch 13.

When a vehicle is in a straight line driving condition, it can be separately driven by an independent driving part or a power coupling part. Both modes can implement stepless electromechanical compound transmission. Driving the vehicle by the independent driving part is a first mode, which is used for a vehicle speed range from zero to a moderate speed. In the first mode, an engine drives two motors/generators of a power coupling mechanism to generate electricity, and both straight driving and steering of the vehicle are implemented by two independent drive motors. Driving the vehicle by the power coupling part is a second mode, which can be used for a vehicle speed range from a speed lower than the highest speed in the first mode to the highest speed of the vehicle. In the second mode, when a revolution speed of the engine keeps unchanged, stepless regulation can be conducted on an output vehicle speed by adjusting revolution speeds of a first motor/generator and a second motor/generator of the power coupling mechanism, to improve the driving performance of the vehicle. In the second mode, an independent drive motor can operate in a power generation condition or an electric condition according to a drive requirement, and can be used to provide high-power electric energy or achieve good power performance. When revolution speeds of independent drive motors are different, steering of the tracked vehicle can be implemented. Regenerative power of an inner track during steering in driving can flow back through a main axis of a straight-driving variable speed path and transferred to an outer track, to improve the steering performance of the vehicle. In the present invention, advantages of a series scheme and a series-parallel scheme are combined. The series mode is suitable for a low-speed operating condition, and can satisfy requirements of low-speed slope climbing and driving in reverse gear based on a large torque and multi-quadrant operation of a motor. The series-parallel mode is suitable for a medium-high speed operating condition, and makes full use of high mechanical transmission efficiency and stepless speed changing of electric transmission, to realize efficient stepless transmission. A control element can implement switching between the first mode and the second mode without a speed deviation. This improves the smoothness of mode switching and reduces the impact and mode switching time.

According to a characteristic that a relatively large torque is required when a tracked vehicle climbs a slope at a low speed, the first mode is mainly used for climbing a large slope of 32°, etc., or other roads extremely difficult to drive upon. It can also be used to implement low-speed driving, accelerated driving, center steering, etc. of the vehicle. In other words, the first mode is a series mode, which can satisfy a torque output requirement, and is mainly used for low and medium-low speed driving, as well as reverse driving and climbing steep slopes. The second mode is a series-parallel mode, which can satisfy requirements of high and medium-high speed driving and achieve relatively high transmission efficiency and fuel economy.

Certainly, the present invention may further include other various embodiments. A person skilled in the art can make various corresponding modifications and variations according to the present invention without departing from the spirit and essence of the present invention, but all these corresponding modifications and variations shall fall within the protection scope defined by the appended claims in the present invention.

What is claimed is:

1. An electromechanical compound transmission device for a tracked vehicle, comprising a front transmission mechanism, a power coupling mechanism, an independent drive mechanism, and convergent planetary gearsets arranged on both sides of the power coupling mechanism, wherein the front transmission mechanism comprises a main clutch configured to cut off power of an engine, two to three spur gear engagement pairs, and the spur gear engagement pair is configured to match a transmission ratio and adjust positions of the engine, the power coupling mechanism, and the independent drive mechanism;

the power coupling mechanism comprises two planetary gearsets, two motors/generators, and two control components; the spur gear engagement pair drives a spur gear; the spur gear is drivingly connected to a planet carrier of a second planetary gearset, a ring gear of the second planetary gearset is fixedly connected to a planet carrier of a first planetary gearset, and a rotor of a first motor/generator is connected to a ring gear of the first planetary gearset; the power coupling mechanism further comprises a power coupling mechanism clutch and a brake; a driving part of the power coupling mechanism clutch is connected to the planet carrier of the first planetary gearset, and a driven part of the power coupling mechanism clutch is connected to a power coupling output spindle; the first motor/generator is located between the power coupling mechanism clutch and the first planetary gearset; sun gears of the first planetary gearset and the second planetary gearset are connected together and are connected to a rotor of a second motor/generator, and the second motor/generator is located between the second planetary gearset and the convergent planetary gearset on the right side; the power coupling output spindle provides output to ring gears of the convergent planetary gearsets; and the independent drive mechanism comprises two motors, two planetary gearsets, and multiple spur gears, wherein power of the two motors is respectively output to spindles through deceleration planetary gearsets, and is output to sun gears of the convergent planetary gearsets through multiple gear engagements of spur gears; planet carriers of the convergent planetary gearsets on the left and right side are output components of the electromechanical compound transmission device; and the power is finally transferred to drive wheels on two sides of a vehicle body.

2. The electromechanical compound transmission device for a tracked vehicle according to claim 1, wherein the first motor/generator and the second motor/generator of the power coupling mechanism and the two motors of the independent drive mechanism are connected to a controller through wires; and the controller is connected to an energy storage device through wires.

3. The electromechanical compound transmission device for a tracked vehicle according to claim 2, wherein the energy storage device is one or more of a chemical storage battery, a supercapacitor, and a flywheel battery.

4. The electromechanical compound transmission device for a tracked vehicle according to claim 1, wherein the brake is a wet multi-disc brake; and the power coupling mechanism clutch is a wet multi-disc clutch.

5. The electromechanical compound transmission device for a tracked vehicle according to claim 1, wherein all the first motor/generator, the second motor/generator, and the two independent drive motors are permanent magnet synchronous motors, and all rotors thereof comprise hollow shafts.

6. The electromechanical compound transmission device for a tracked vehicle according to claim 1, wherein the first motor/generator, the second motor/generator, the two independent drive motors, and the energy storage device are connected to a control unit through wires.

7. The electromechanical compound transmission device for a tracked vehicle according to claim 1, wherein the engine is a diesel engine.

* * * * *